INVENTOR.
CALVIN W. GILLARD
BY
*George C. Sullivan*
Agent

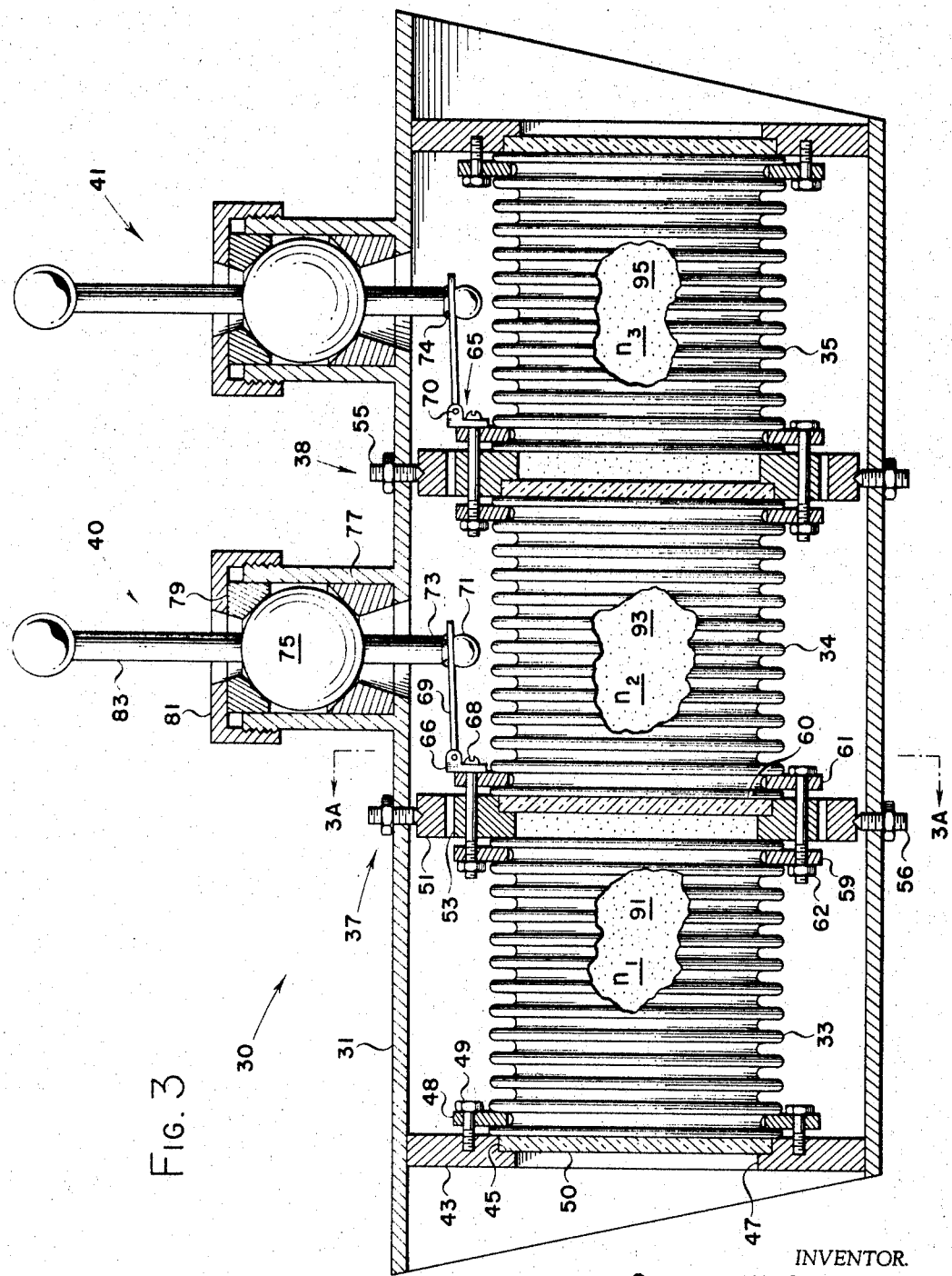

United States Patent Office 3,438,700
Patented Apr. 15, 1969

3,438,700
OPTICAL BEAM DEVIATOR
Calvin W. Gillard, Palo Alto, Calif., assignor to Lockheed Aircraft Corporation, Burbank, Calif.
Filed June 25, 1965, Ser. No. 466,991
Int. Cl. G02b 1/06, 5/00, 7/00
U.S. Cl. 350—285     4 Claims

ABSTRACT OF THE DISCLOSURE

An optical beam deviator in which the deviation angle is controlled by changing the angle at which the optical beam intersects the plane of the interface of adjacent refractive mediums. By using three or more adjacent fluids of different refractive indexes coarse and fine beam deviation control is achieved.

---

The present invention relates to an optical beam deviator and more particularly to an optical beam deviator which is uniquely suitable for laser beam applications.

There have been many different techniques employed for the deviation of light beams. However, each of these techniques has its own peculiar set of operating conditions which often provide disadvantages for some applications. Typical means by which light beams have been deviated include such devices as pivoted and gimballed mirrors, rotating prisms in a polar coordinance system, prisms employing variable refractive index dielectrics, devices employing electro-optic materials, and lens systems in which the beam is angularly displaced relative to its original direction by means of transverse displacements of lens elements.

The present invention uniquely utilizes the different refractive indexes of adjacent mediums through which the light is transmitted; the particular deviation angle is achieved by changing the angle at which the light beam intersects the plane of the interface of the adjacent refractive mediums. One of the embodiments of the present invention incorporates more than two adjacent mediums of different refractive indexes which provides a technique having greater selection of resultant indexes of refraction as well as a technique for providing coarse and fine beam deviation control. The present invention obviates certain disadvantages of the prior art techniques inasmuch as it provides an in-line device that is insensitive to vibrations and is readily adaptable to a rectangular coordinate system. In addition, it has very low loss characteristics since its efficiency may be of the order of 99% as compared to the 90% efficiency of conventional mirror systems. Furthermore, the present invention provides a technique for building inexpensive devices which have both coarse and fine control and flexibility as to the amount of angular deviation possible which is achieved by choosing different gas or liquid mediums having higher or lower indexes of refraction.

The specific nature of the invention, as well as the objects, uses and advantages thereof, will be clearly apparent from the following description and from the accompanying drawing in which:

FIGURE 1 schematically illustrates the basic concept of an optical beam deviator in accordance with the present invention.

FIGURE 2 schematically illustrates the preferred embodiment of an optical beam deviator in accordance with the present invention.

FIGURE 3 is a partial cut-away view of an embodiment of an optical beam deviator showing the details of the present invention.

Like numerals designate like elements throughout the figures of the drawings.

Figure 1:
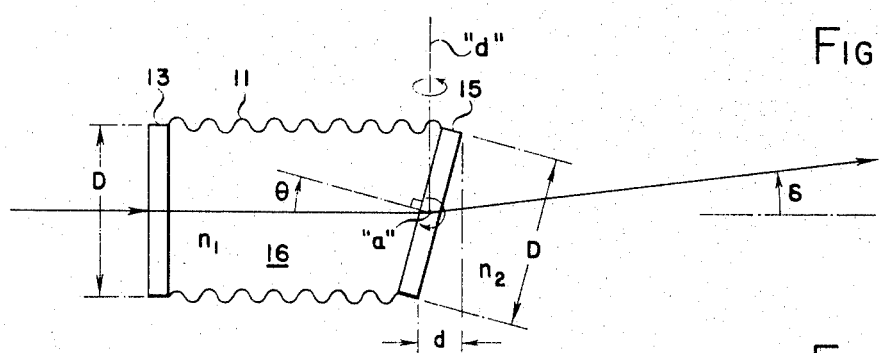

In FIGURE 1 is schematically illustrated the basic concept of the optical light beam deviator of the present invention. This device consists of a flexible tube 11 which is sealed at one end with an optically flat window 13 and is sealed at the other end with an optically flat window 15. Cavity 16, formed between tube 11 and windows 13 and 15, is filled with a dielectric medium, which may be a liquid or gas, having a refractive index $n_1$. The refractive index of the medium outside of the device, which in most instances would be air, is denoted as $n_2$. A beam of light is transmitted normal to window 13 and is directed through the device as illustrated. After passing through the dielectric medium it is refracted in the plane of the paper by an angle $\delta$ with respect to the axis of window 13 or the initial direction of the light beam. This refraction occurs when window 15 is rotated about an axis $a$, which is normal to the plane of paper. The following analysis is provided to more clearly describe the basic principles and operation of the device shown in FIGURE 1.

Snell's law defines the relation between the angle of incidence ($\theta$) and the angle of refraction ($r$) at the boundary between two fluids (having indexes of refraction $n_1$ and $n_2$ respectively). Snell's law is:

(1) $$n_1 \sin \theta = n_2 \sin r$$

for small angles the sine of an angle is approximately equal to the angle; expressed as a mathematical expression:

(2) $$\sin \theta \approx \theta \text{ and } \sin r \approx r$$

substituting the angles for the sine of the angles in (1)

(3) $$n_1 \theta \approx n_2 r$$

the angle of refraction can be defined as a fraction of the angle of incidence as:

(4) $$r = \theta + \delta$$

where $\delta$ is defined as the angular deviation due to the boundary layer. Substituting Equation 4 in Equation 3

$$n_1 \theta \approx n_2(\theta + \delta) = n_2 \theta + n_2 \delta$$

solving for $\delta$ (5) $$\delta \approx \frac{1}{n_2}(n_1 - n_2)\theta$$

The index of refraction of air is 1.0003. Therefore, when the medium external to the cavity is air, $n_2$ equals 1.0003, and the equation can be simplified to (6) $$\delta \approx (n_1 - n_2)\theta$$

where $\theta$ is angle of rotation of window 15, $n_1$ is the index of refraction of the medium in cavity 16, $n_2$ is the index of refraction of the medium external of the device and $\delta$ is the angle of deviation of the light beam. For convenience, each of the symbols $n_1$, $n_2$, etc., shall denote a specific medium as well as its index of refraction. An alternative expression for (1) is:

(7) $\qquad \delta \approx (n_1-n_2)d/D$ where $\theta = d/D$ where distances $d$ and $D$ are the side opposite angle $\theta$ and the hypotenuse of the right triangle respectively. Distance $d$ and $D$ are the distances illustrated in FIGURE 1. This relationship holds when $\theta$ is a small angle, for example, less than 10°.

The refractive indexes of the windows having plane parallel surfaces do not enter into the above equations; there would be no beam deviation through window 13 since the light beam is normal to the plane surfaces thereof, and the slight beam displacement due to window 13 would be lateral and not angular.

Very small angular deviations of the FIGURE 1 device may be obtained by filling cavity 16 with a medium ($n_1$) having a refractive index close to that of the external medium ($n_2$), which for many applications would be air (where $n_2=1.0003$). Such a medium ($n_1$) might be benzine or pentane which have equal refractive indexes ($n_1=1.0017$). By substituting this set of conditions into Equation 6 it can be seen that (8) $\qquad \delta \approx 1.4 \times 10^{-3}\theta$ This relationship illustrates that the beam deviation ($\delta$), for this set of conditions, is linear and relatively insensitive to changes in $\theta$. That is, if $\theta$ or the angle of rotation is changed by one degree (1°) then $\delta$ or the beam deviation will change by only .0014°. These qualities are quite important since servo system control often requires linear relationships and extremely fine control is required in many laser beam pointing applications.

For applications where large deviation angles are required, a liquid such as water could be used to fill cavity 16. The index of refraction for water is about 1.3 and it can therefore be seen from Equation 6 that:

(8a) $\qquad \delta \approx 0.3\theta$

By comparing Equation 8, which denotes the deviation angle using benzine, with Equation 8a, which illustrates the deviation angle using water, it can be seen that fine and coarse control can be realized by simply changing the medium employed in cavity 16.

Assuming the beam is refracted by an amount equal to the diffraction limited beam-width corresponding to the aperture of the apparatus, the following expression defines the beam deviation (see "Fundamentals of Optics" by F. A. Jenkins and H. E. White, Second Edition, 1950, McGraw-Hill, New York):

(9) $\qquad \delta_{1/2} \approx \lambda/D \approx (n_1-n_2)d_{1/2}/D$ or

(10) $\qquad d_{1/2} \approx \lambda/(n_1-n_2)$ where:

$\lambda$ = wavelength of the beam under consideration,
$D$ = diameter of the aperture,
$\delta = \lambda/D$,
$d_{1/2}$ = the value of $d$ which moves the deflected pattern of the beam by one beam-width,
$n_1$ and $n_2$ are defined in Equation 1.

From the above it can be seen that the angular deviation (the movement of the refraction pattern by one beam-width) is independent of the diameter of the aperture or window ($D$). This is important since it is now possible to build a device of predetermined size and still have the device capable of handling diffraction limited light beams of various diameters without commensurate changes in basic device control apparatus.

Figure 2:
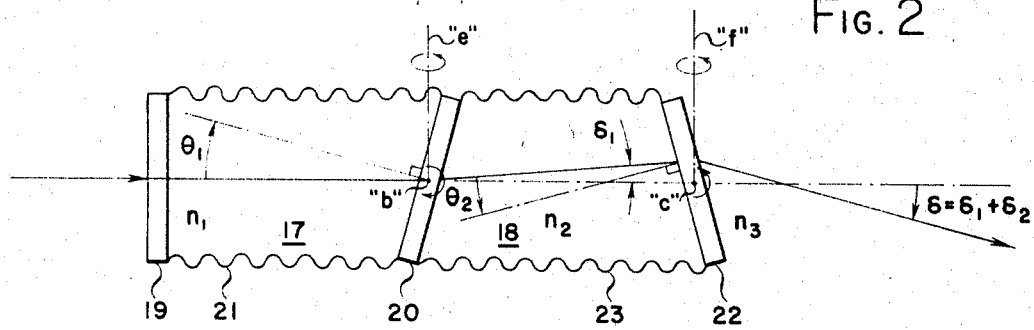

It is now apparent that a device using one particular medium can realize very fine control and that the same device using another medium may realize a very coarse control. However, in many applications it is desirable to have a device over which it is possible to simultaneously exercise both fine and coarse control of the light beam. This is not possible in the devices schematically illustrated in FIGURE 1; however, a device capable of such simultaneous control is schematically illustrated in FIGURE 2. Not only does the FIGURE 2 embodiment provide simultaneous coarse and fine control but it provides a device in which it is possible to select intermediate deviation response factors (defined as $R = \Delta\theta/\Delta\delta$) not otherwise easily obtainable.

It can be shown from the previous equations that this deviation response factor ($R$), which is defined as the ratio of the incremental angular deviation of an optical element (system input) to the incremental angular deviation of the output beam (system output), may be expressed as follows:

(11) $\qquad R = \Delta\theta/\Delta\delta = \dfrac{1}{n_1-n_2}$ where:

$\Delta\theta$ = incremental angular deviation of the optical element,
$\Delta\delta$ = incremental angular deviation of the output beam,
$n_1$ and $n_2$ are defined in Equation 1.

Therefore, different deviation response factors ($R$) may be obtained by merely selecting different mediums $n_1$ and $n_2$.

Assuming that the medium $n_1$ of FIGURE 2 is 1.29 and the medium $n_2$ is 1.30, it can be seen from Equation 8 that the deviation response factor ($R$) will be large for window 20. Therefore, rotation of window 20 about the axis at point $b$ will result in a small angle of beam deviation ($\theta_1$). Whereas, the angle of deviation ($\delta_2$) will be relatively large as compared to $\delta_1$ when window 22 is rotated by an angle $\theta_2$ (where $\theta_1$ equals $\theta_2$) about the axis at point C. It can therefore be seen that if $\theta_1$ and $\theta_2$ are rotated by the same amounts that the angles of deviation $\delta_1$ and $\delta_2$ will be small and large, respectively, which will therefore provide fine control by rotating window 20 and coarse control by rotating window 22.

The total angular deviation ($\delta$) of a device having two boundary layers may be expressed in terms of the deviation caused by each of the boundary layers as

(12) $\qquad \delta = \delta_1 + \delta_2$ where:

$\delta$ = total angular deviation,
$\delta_1$ = angular deviation due to the first boundary layer,
$\delta_2$ = angular deviation due to the second boundary layer.

Using (6)
(13) $\qquad \delta_1 \approx (n_1-n_2)\theta_1$
(14) $\qquad \delta_2 \approx (n_2-n_3)\theta_2$ where:

$n_1$ = the index of refraction of the first fluid,
$n_2$ = the index of refraction of the second fluid,
$n_3$ = the index of refraction of the third fluid,
$\theta_1$ = the angle of refraction at the boundary layer, between the first fluid and the second fluid,
$\theta_2$ = the angle of refraction at the boundary layer between the second fluid and the third fluid.

Substituting (13) and (14) in (12)

(15) $\qquad \delta = \delta_1 + \delta_2 \approx (n_1-n_2)\theta_1 + (n_2-n_3)\theta_2$ For the device illustrated in FIGURE 2 the angular deviation ($\delta$) may be expressed by the relationship:

(16) $\qquad \delta = \delta_1 + \delta_2 \approx (n_1-n_2)\theta_1 + (n_2-n_3)\theta_2$ The relationship defined in Equation (16) is of particular significance inasmuch as there is no interdependency between mediums $n_1$ and $n_2$ respectively disposed in cavities 17 and 18. From FIGURE 2 it can be seen that cavity 17 is formed between windows 19 and 20 and bellows 21 and cavity 18 is formed between windows 20 and 22 and bellows 23.

It will be appreciated that the devices schematically illustrated in FIGURES 1 and 2 may readily operate within the constraints of a rectangular coordinate system. That is, the device shown in FIGURE 1 may provide a beam deviation in the plane of the paper by rotation of window 15 about the axis $a$, which is normal to the paper, and a deviation angle in a plane normal to the paper and along the center line of the device by rotation of window 15 about an axis $d$, which is in the plane of the paper and normal to the center line of the device. In like manner windows 20 and 22 of the FIGURE 2 embodiment may provide rectangular coordinate system control by rotation about the axis defined by $b$, $c$, $e$ and $f$.

Figure 3A:
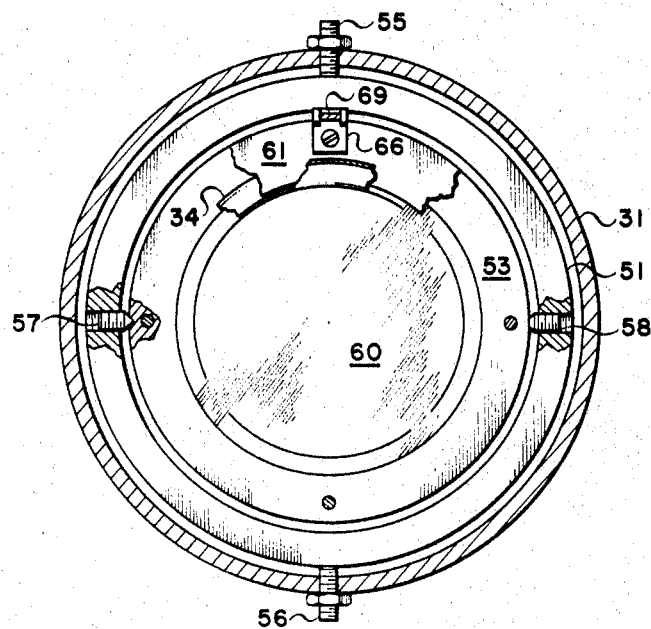
FIGURE 3A is a sectional view taken along line 3A—3A in FIGURE 3.

FIGURE 3 and FIGURE 3A illustrate a specific embodiment of the beam deviating device, the basic principles of which were previously described with relation to the beam deviating devices shown in FIGURES 1 and 2. It will be appreciated by those skilled in the art that the hereinafter described embodiment sets forth only one specific means by which the device may be built and that it will be apparent that various modifications of construction may be employed.

The beam deviating device of FIGURE 3A is generally referred to by numeral 30 and basic elements of this device include housing 31, bellows 33, 34 and 35, gimbal mount 37, gimbal mount 38, fine control mechanism 40 and coarse control mechanism 41. Positioned at the leftmost end of housing 31 is circular end plate 43 having a shoulder 45 and an aperture 47 through which light may be transmitted. Retainer ring 48 has a plurality of openings formed in the outer periphery thereof for receipt of bolts 49. Bellows 33 are attached to end plate 43 by means of retainer ring 48 which is placed in the groove between the first and second leftmost convolutions of the bellows and rigidly held in place by tightening bolts 49 into end plate 43. Window 50 is positioned between the end convolution of bellows 33 and shoulder 45 and a tight seal is obtained by tightening bolts 49.

Gimbal mount 37 includes an outer ring 51, an inner ring 53, vertical pivots 55 and 56 and horizontal pivots 57 and 58. The vertical pivots 55 and 56 are rigidly connected to housing 31, as shown in FIGURE 3, and the horizontal pivots 57 and 58 are rigidly connected to outer ring 51 as shown in FIGURE 3A. Bellows 33 are connected to inner ring 53 by retainer ring 59, and bellows 34 and window 60 are connected to inner ring 53 by retainer ring 61. A plurality of bolts are inserted through retainer ring 61, inner ring 53 and retainer ring 59 and rigid connection of these elements is achieved by tightening nuts 62. It can therefore be seen that window 60 may be rotated about the vertical axis (pivots 55 and 56) and about the horizontal axis (pivots 57 and 58).

Hinge member 65 interconnects gimbal mount 37 and fine control mechanism 40 and functions to rotate window 60 about the horizontal and vertical axes in response to operation of fine control mechanism 40. Hinge 65 includes member 66 which is rigidly connected to retainer ring 61 by means of bolt 68 which is also employed to rigidly connect the bellows to inner ring 53. Member 69 of hinge 65 is pivotably connected to member 66 by means of pin 70 such that member 69 will rotate about pin 70 in an axis that is perpendicular to the plane of the paper. The other end of member 69 has an opening that has a smaller diameter than that of ball joint 71 of control rod extension 73. Member 69 is inserted over the shaft of control rod extension 73 and is held in contact with ball joint 71 by means of rubber O ring 74 that is positioned adjacent thereto. Control rod 73 is connected to ball joint 75 which is mounted between bearing surfaces 77 and 79. Cap 81 is provided to retain these bearings in place and to lock control rod 73 by tightening thereof. Upper control rod 83 is connected to ball joint 75 to provide means for actuation of fine control mechanism by either hand or by the actuating element of a servo system.

Fine control of beam deviating device 30 is achieved by actuating upper control rod 83 in either the plane of the paper, or a plane vertical of the paper, or in any component plane. Assuming that control rod 83 is actuated in the plane of the paper, then member 69 of hinge 65 will have longitudinal movement and a corresponding small degree of rotation about hinge pin 70 such as to cause rotation of window 60 about pivot members 57 and 58. If upper control rod 83 is actuated in a plane vertical to the plane of the paper, then member 69 of hinge 65 will be actuated in a plane that is perpendicular to the plane of the paper which will cause window 60 to rotate about pivots 55 and 56. Any motion of upper control rod in a plane which is neither exclusively in the plane of the paper or vertical to the plane of the paper will result in a movement of member 69 which is both in the plane of the paper and normal to the plane of the paper. This will in turn cause rotation of window 60 both about pivots 57 and 58, and 55 and 56.

Gimbal mount 38 is identical to gimbal mount 37 and will therefore not be described. In addition, the right most support member is the same as the left most support member and will therefore not be described.

In view of the foregoing it can be seen that fine control may be achieved when the mediums ($n_1$ and $n_2$) used in cavities 91 and 93 have about the same index of refraction. Coarse control is achieved when the index of refraction of the medium ($n_2$) in cavity 93 is substantially different from that of the medium ($n_3$) in cavity 95. This would be accomplished, for example, when mediums $n_1$ and $n_2$ are liquids having slightly different indexes of refraction and $n_3$ is air or gas having a substantially different index of refraction than the mediums $n_1$ or $n_2$. The embodiment shown in FIGURES 3 and 3A has three cavities; however, adequate coarse and fine control may be achieved by using only cavities 91 and 93 where the medium $n_3$ would be the surrounding atmosphere such as air. It will be appreciated that $n_3$ could be filled with a medium having an index of refraction different from that of $n_1$, $n_2$ and the surrounding medium. Furthermore, the end window of cavity 95 could be gimballed in a manner similar to that of window 60. In view of the foregoing it will be appreciated that devices may be made having additional cavities, mediums and controllable windows to provide greater sensitivity or flexibility of the device.

It is understood in connection with this invention that the embodiments shown are only exemplary, and that various modifications can be made in construction and arrangement within the scope of the invention as defined in the appended claims.

I claim:
1. An optical beam deviator having a light passage path therethrough comprising:
   a first, second and third optically flat window,
   a first and second flexible tube member having open ends,
   a first fluid disposed within said first flexible tube member,
   a second fluid disposed within said second flexible tube member,
   said first fluid and said second fluid having different indices of refraction,
   said second window forming a connecting boundary between said first and second fluids in said first and second tube members, respectively,
   said first window rigidly affixed to and substantially closing the open end of said first tube member,
   said third window rigidly affixed to and substantially closing the open end of said second tube member,
   at least two of said windows being universally pivotably mounted so that coarse and fine beam deviation adjustment may be obtained.

2. The device according to claim 1 wherein said first and second windows are said two universally pivotably mounted windows.

3. The device according to claim 2 wherein:
said first fluid is further defined as having an index of refraction of substantially 1.0017.

4. The device according to claim 3 wherein:
said second fluid is further defined as having an index of refraction of substantially 1.3.

References Cited

UNITED STATES PATENTS

| | | |
|---|---|---|
| 2,504,039 | 4/1950 | O'Leary _____ 350—286 X |
| 2,949,030 | 8/1960 | Horsfall et al. |
| 3,034,398 | 5/1962 | Barnes et al. _____ 350—286 X |
| 3,212,420 | 10/1965 | De La Cierva ____ 350—285 X |
| 3,337,287 | 8/1967 | Lessman. |

RONALD L. WILBERT, *Primary Examiner.*

J. ROTHENBERG, *Assistant Examiner.*